March 8, 1949.  H. W. GUTRIDGE  2,463,868
GAME BOARD AND AN ALIGNING SCALE THEREFOR
Filed Aug. 2, 1945
Fig. 1
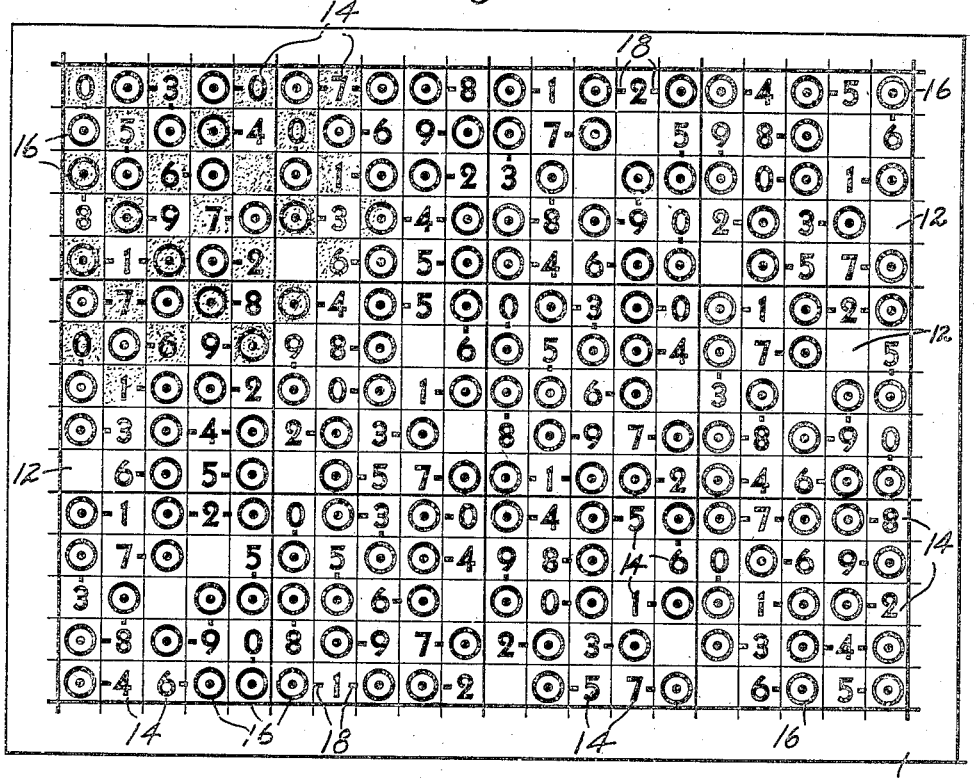
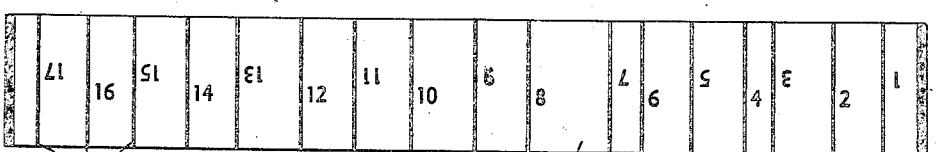
Fig. 2
Fig. 3
INVENTOR.
Hollister W. Gutridge
BY Chas. R. Fay
atty.

Patented Mar. 8, 1949

2,463,868

UNITED STATES PATENT OFFICE 2,463,868

GAME BOARD AND AN ALIGNING SCALE THEREFOR

Hollister W. Gutridge, Worcester, Mass.

Application August 2, 1945, Serial No. 608,433

5 Claims. (Cl. 273—130)

1

This invention relates to a game for play by two or more people and is particularly adapted for group play wherein each person plays against all the others.

Objects of the invention include the provision of a game board having squares in certain of which are located numerals from 0 to 9, each numeral having a contiguous square containing a circle, there being a connection from each numeral to one circle to link the numeral to the circle, and a scale having irregularly spaced lines or graduations thereon each of which is identified with a numeral, it being the object of the game to aline the scale with its lines cutting circles according to a series of digits as called by the "leader" or one conducting the game.

Other objects and advantages of the invention will appear hereinafter.

Reference is to be had to the accompanying drawings, in which

Fig. 1 is a plan view of the game board;

Fig. 2 is a plan view of one type of scale; and

Fig. 3 shows a different scale for alternate use.

The game board 10 is divided into a plurality of squares some of which are blank as at 12 and others of which are labeled with numerals 0–9 inclusive as at 14.

Each numeral has a contiguous square containing a circle 16 and a mark 18 linking the circle to a number. In some cases a numeral may be linked to more than one circle.

A scale goes with each game board and this scale may appear as in Fig. 2 at 20 with cross lines or graduations in triplets as at 22 with the central line of each triplet heavy. The lines are numbered for reference. Another scale 24 has only single heavy lines 26, the lighter lines in Fig. 2 being to aid in determining when a circle is cut or entered upon by a cross line 22.

One person or leader will call a series of numbers such as 1, 8, 6, 4, and the players, each using one game board and one scale, will aline scale lines with circles linked to the numerals given, thus exercising skill and visual acuity. The first to correctly aline the scale wins the game. Also, all other circles are to be avoided by the scale lines 22 so that only the numbers called are pointed out by the scale.

It is pointed out that any identifying characters may be used in place of the circles, but in this case, the dots aid in correctly locating the circles. Either edge of the scale may be used but not both as the circles should be pointed out in line. The scales may be as long as desired, and may be curved or have angles therein, but the principle is the same and comes within the scope of the invention.

It is to be understood that this invention is

2 not limited to the numerals and circles, but any characters of different colors may be used within the scope of the invention.

Having thus described my invention and the advantages thereof, I do not wish to be limited to the details herein disclosed, otherwise than as set forth in the claims, but what I claim is:

1. A game comprising a subdivided sheet, identifying indicia in certain of the subdivisions, and different indicia in certain other subdivisions, there being an index for each of said different indicia linking the latter to certain of the first named indicia, and a scale, lines on the scale, said lines being arranged to point out various of the first named indices by aligning with the said different indices linked thereto.

2. The game of claim 1 wherein the scale lines are irregularly spaced so that certain of the first named identifying indicia may be omitted in the alignment of the scale lines with the said different indicia.

3. A game comprising a subdivided sheet, numerals in certain of the subdivisions, uniform characters in contiguous subdivisions, and links between the characters and certain numerals, and a scale, lines on the scale to point out a series of the numerals by cutting into or alinement with the characters linked therewith.

4. A game comprising a subdivided sheet, characters in certain of the subdivisions, different characters in contiguous subdivisions, means linking certain of the characters, a scale, and lines on the scale to point out the first named characters by alinement with the second named characters linked therewith.

5. A game comprising a subdivided sheet, colors in certain different subdivisions, a uniform but different color in contiguous subdivisions, links between the first and second named subdivision, and a marked scale to aline with the second named color to indicate the first named colors thru the links.

HOLLISTER W. GUTRIDGE.

REFERENCES CITED

The following references are of record in the file of this patent:

UNITED STATES PATENTS

| Number | Name | Date |
|---|---|---|
| 508,754 | Quick | Nov. 14, 1893 |
| 1,604,127 | Lambert | Oct. 26, 1926 |
| 1,642,424 | Massey | Sept. 13, 1927 |

FOREIGN PATENTS

| Number | Country | Date |
|---|---|---|
| 389,722 | France | Sept. 16, 1908 |